United States Patent
Sandstrom et al.

(10) Patent No.: US 8,452,901 B1
(45) Date of Patent: May 28, 2013

(54) ORDERED KERNEL QUEUE FOR MULTIPATHING EVENTS

(75) Inventors: Harold M. Sandstrom, Belmont, MA (US); Tao Tao, Cambridge, MA (US); Hitesh Trivedi, Cambridge, MA (US); Robert J. Pellowski, Ledyard, CT (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/341,343

(22) Filed: Dec. 30, 2011

(51) Int. Cl.
*G06F 3/00* (2006.01)
*G06F 7/00* (2006.01)
*G06F 12/00* (2006.01)

(52) U.S. Cl.
USPC .............................. 710/39; 707/752; 707/822

(58) Field of Classification Search
USPC ........... 707/752, 822; 711/113, 114; 709/223, 709/224; 710/36, 58, 38, 39, 40, 62
See application file for complete search history.

(56) References Cited

U.S. PATENT DOCUMENTS

| | | | |
|---|---|---|---|
| 6,636,909 B1 * | 10/2003 | Kahn et al. ...................... 710/60 |
| 7,363,399 B2 * | 4/2008 | Shum et al. ..................... 710/52 |
| 8,276,140 B1 * | 9/2012 | Beda et al. ........................ 718/1 |
| 2003/0061296 A1 * | 3/2003 | Craddock et al. ............. 709/212 |
| 2004/0044846 A1 * | 3/2004 | Matthews et al. ............. 711/113 |
| 2004/0194095 A1 * | 9/2004 | Lumb et al. ................... 718/100 |
| 2005/0021708 A1 * | 1/2005 | Raghuraman et al. ........ 709/223 |
| 2009/0259749 A1 * | 10/2009 | Barrett et al. ................. 709/224 |
| 2010/0274816 A1 * | 10/2010 | Guzik ........................... 707/802 |

* cited by examiner

*Primary Examiner* — Hung T Vy
(74) *Attorney, Agent, or Firm* — BainwoodHuang

(57) ABSTRACT

An improved technique for handling events in a multipathing driver employs an event queue and a queue manager that run in the kernel of a computing system. The queue manager receives events raised by the multipathing driver, as well as events raised by software constructs, such as application programs. Records of events are added to the event queue in the order the queue manager receives them. Event records may be consumed chronologically by external software. Preferably, the event queue is sufficiently large to store all events arising out of most predicted fault scenarios. Also, the queue manager is sophisticated and can perform certain diagnostic and analysis tasks without the aid of external software.

20 Claims, 6 Drawing Sheets

ORDERED KERNEL QUEUE FOR MULTIPATHING EVENTS

BACKGROUND

Host computing systems, or simply "hosts," such as data servers, web servers, and enterprise computing systems, typically employ storage arrays for storing large amounts of data. Hosts generally connect to respective storage arrays through multiple paths. Multiple paths allow for redundant connections, parallel data transmission, load balancing, and failover.

A typical host employs a multipathing driver to manage the various paths connecting the host to the storage array. The multipathing driver is installed as a kernel extension in the host's operating system. Typical roles of the multipathing driver include selecting paths for optimal load balancing between the host and the storage array and responding to faults by routing data around inoperative paths. An example of a multipathing driver is the PowerPath® driver from EMC Corporation of Hopkinton, Mass.

Multipathing drivers are generally configured to raise events. As is known, "events" are occurrences in or pertaining to hosts, paths, or storage arrays, which can be detected and recorded. Most conventional multipathing drivers are configured to store records of events in a system log. The system log typically resides in a file accessible in a file system of the host. Software programs can obtain information about events by accessing the system log (e.g., "log scraping") and applying intelligent algorithms to diagnose or predict problems. In addition to using system logs, the PowerPath® driver also stores a single record of an event in kernel memory. A software interface provided with this driver allows applications, such as data storage administration programs, to direct the driver to return the next event that occurs. If an event occurs within a designated timeout interval, a record of the event is sent to the application through the software interface. The application can then examine the event record to obtain information about the host, paths, or storage array.

SUMMARY

The ability of data storage administrators to access records of events from the system log and from the multipathing driver affords data storage administrators an opportunity to diagnose and predict problems with the host, paths, or storage array. For example, information from the log file can be used forensically to reconstruct a series of events that led to a particular failure, thus explaining the failure. Also, information from the log file that indicates that multiple paths have become inoperative can be used to predict that a data storage request might imminently fail or become unacceptably slow (e.g., if even more paths become inoperative). In addition, event records from the multipathing driver can be used for testing purposes, e.g., to determine whether a particular stimulus applied to a path causes an expected response to occur, in the form of a raised event.

The conventional approach to managing events among hosts, paths, and storage arrays involves certain drawbacks. For example, the conventional approach relies heavily upon use of the system log. It has been observed, however, that access to the system log is not always easily obtained. Multipathing drivers are generally designed to function with many different operating systems. Each operating system typically requires configuring its own system-specific daemon for exchanging information between the multipathing driver and the system log. System-specific daemons are often burdensome to maintain as operating systems are updated. In addition, new daemons must be configured when new operating systems come online. Indeed, some operating systems, such as embedded operating systems, often prohibit use of these daemons altogether, significantly compromising the ability of a computing system to obtain useful information about events.

In addition, storage of event records in the system log can involve unpredictable delays, which undermine the timing accuracy of event records. In the conventional scheme, an event is written to the system log by the multipathing driver through various operating system constructs. However, logging of the event can be variably delayed based on other activities that the operating system is performing at the same time. Although the system log generally applies a timestamp to each incoming event, the timestamp reflects the time when the system log actually receives the event, which can differ substantially and variably from the time the event actually occurs. Information about time-critical events can therefore be lost or distorted.

In contrast with the above-described conventional approach, which often involves burdensome maintenance of different software daemons for use with different operating systems and introduces unpredictable latency when timestamping events, an improved technique for handling events employs an event queue running within a multipathing driver installed in an operating system kernel. As the event queue is located within the multipathing driver, there is no need for operating system specific daemons that communicate with system logs to obtain event records. Burdensome activities associated with maintaining different daemons for different operating systems can be therefore avoided. The multipathing driver adds events to the event queue in the order received and timestamps events upon receipt. As timestamps are applied locally, within the multipathing driver itself, variable delays inherent in timestamping events at the system log can be avoided, as well. The multipathing driver is preferably sophisticated and can provide support to external software for performing diagnostic and analysis tasks.

One embodiment of the improvement hereof is directed to a method of managing events pertaining to input/output (I/O) activities in a computing system coupled to a storage array through multiple paths. The method includes receiving multiple first events by a queue manager that manages an event queue. The queue manager and the event queue are parts of a multipathing driver running within a kernel of the computing system. The first events originate from within the multipathing driver. The method further includes receiving multiple second events by the queue manager. The second events originate from a software construct running outside the kernel of the computing system. The method still further includes storing records of the first events and the second events in the event queue, including chronologically ordering the records of events in the order received by the queue manager.

Other embodiments are directed to computerized apparatus and computer program products. Furthermore, some embodiments involve activity that is performed at a single location, while other embodiments involve activity which is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Improved techniques for managing events employ an event queue running within a multipathing driver installed in an operating system kernel. The multipathing driver adds events to the event queue in the order received and timestamps events upon receipt. The multipathing driver is preferably sophisticated and can perform certain analysis tasks without the aid of external software.

Figure 1:
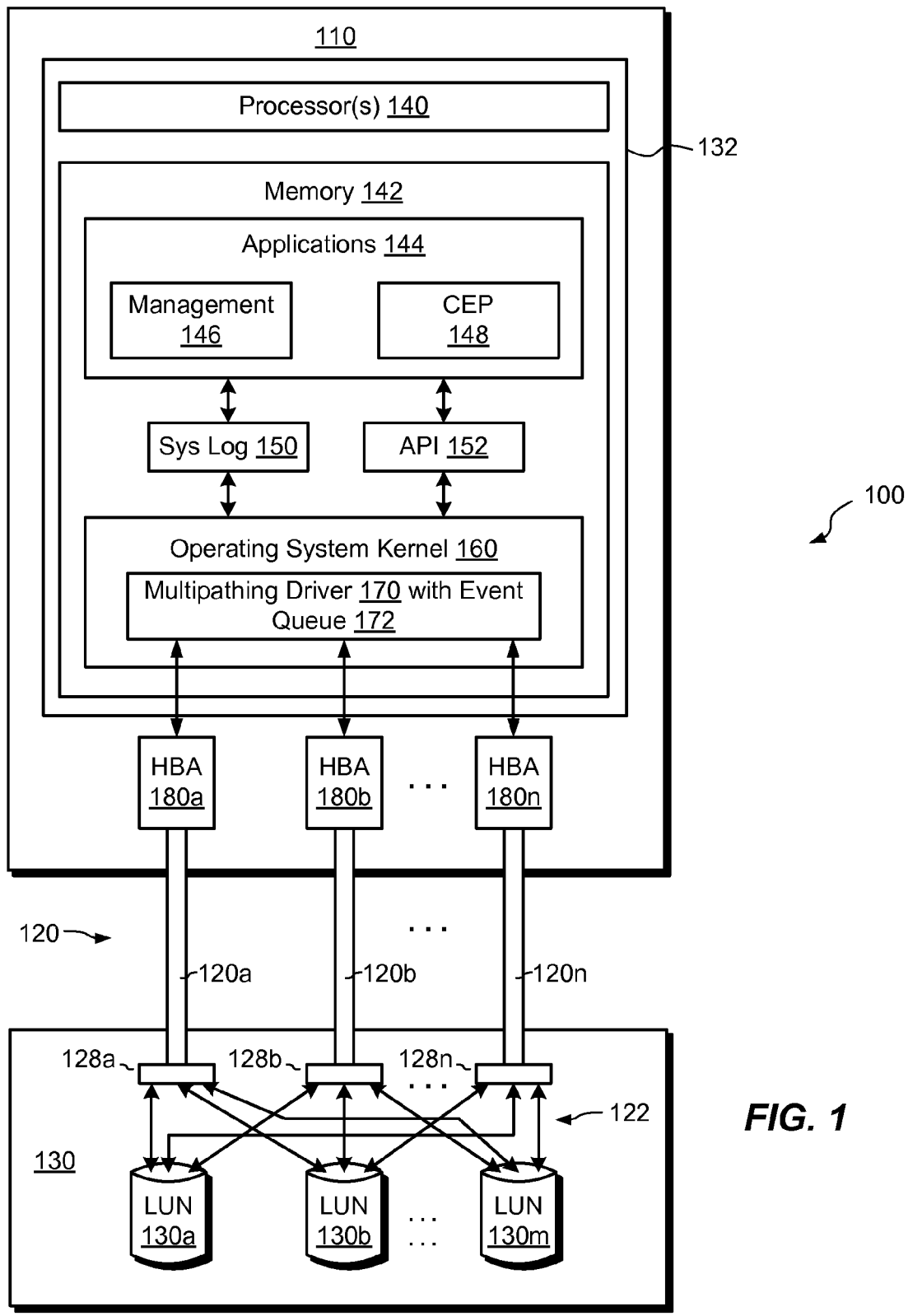
FIG. 1 is a block diagram of an example computing environment employing a multipathing driver that runs within the kernel of a computing system and includes an event queue.

FIG. 1 shows an example computing environment 100 that provides improved multipath event processing. The computing environment 100 includes a computing system, or "host," 110, a transmission medium 120, and a storage array 130. The host 110 includes a set of processors 140 (i.e., one or more processing chips and/or processing boards) and memory 142. The memory 142 includes both volatile and non-volatile memory. Various software constructs run in the memory 142, including an operating system kernel 160 and software constructs running outside the kernel, such as application programs 144, as well as daemons, processes, services, and the like. The application programs 144 can include a data storage management program 146 and a complex event processor 148. The data storage management program 146 is an administrative interface that allows administrators to control data storage components of the computing environment 100 and to receive notifications of faults. The complex event processor 148 is a tool that examines events to produce diagnostic and prognostic results.

A multipathing driver 170, which includes an event queue 172, runs within the operating system kernel 160. The multipathing driver 170 generally runs in volatile memory. A software interface 152, such as an API (application programming interface), runs in the memory 142 for interfacing application programs (e.g., 146 and 148) with the multipathing driver 170. It is understood that the set of processors 140 and the memory 142 function cooperatively and can be regarded as forming a specialized circuit 132, which performs the various processes and functions described herein.

In some embodiments, the memory 142 also includes a system log 150 for storing event records. The system log 150 is generally stored in a file in non-volatile memory (e.g., on a disk drive). However, the role of the system log 150 is generally reduced relative to conventional approaches.

As indicated, the multipathing driver 170 runs within the kernel 160 and is equipped with an event queue 172 for maintaining events raised or received by the multipathing driver 170. The presence of the event queue 172 within the kernel 160 reduces, and in many cases completely avoids, reliance on the system log 150 as a source of information about events.

The host 110 also includes a number of host bus adapters 180a-n. The host bus adapters 180a-n connect the host 110 to the storage array 130 via the transmission medium 120 and enable the host 110 to send and receive large amount of data at high speed to and from the storage array 130. Multiple host bus adapters 180a-n afford redundancy, parallelism, failover, and high throughput. Occurrences within the host bus adapters 180a-n can cause events to be raised within the multipathing driver 170, which are stored in the event queue 172.

The transmission medium 120 includes Initiator-Target nexi (I-T's) or "buses" 120a-120n. Each bus 120a-n aggregates multiple Initiator-Target-LUNs (I-T-L's), i.e., "paths" 122, and can extend over arbitrarily long distances. In an example, the computing environment 100 follows a SCSI communications standard (SCSI is an acronym for Small Computer System Interface). Accordingly, the host bus adapters 180a-n perform the role of SCSI initiators, aggregating paths from the host 110 onto the buses 120a-n. As with the host bus adapters 180a-n, occurrences within the transmission medium 120 can cause events to be raised within the multipathing driver 170, which are stored in the event queue 172.

The storage array 130 is preferably a disk array or some other array of non-volatile storage elements. In the example shown, the storage array 130 includes SCSI targets 128a-n. Individual paths (I-T-L's) branch from the SCSI targets 128a-n and extend to various logical storage units, or "LUNs" 130a-m. Any number of LUNs 130a-m may be provided, and many LUNs can be accessed by the host 110 through each bus (I-T) 120a-n. Each LUN 130a-m is a separately identifiable storage volume, which is logically but not necessarily physically distinct from other LUNs 130a-m. Various switches and computing nodes may also be included in the transmission medium or within the storage array 130; however, these are omitted from the figure for the sake of clarity. As with the host bus adapters 180a-n and the transmission medium 120, occurrences within the storage array 130 can also cause events to be raised within the multipathing driver 170, which are stored in the event queue 172.

The host 110 is typically a server with high data throughput to the storage array 130. However, the host 110 can be any type of computing device, such as a server, desktop computer, laptop computer, or even a computing pad, smart phone, PDA, or similar device. The operating system 160 can be any type of operating system that supports the installation of the multipathing driver 170 as a kernel extension. These may include conventional, GUI-based operating systems, embedded operating systems, real-time operating systems, and so forth. Non-limiting examples include the Windows® operating system, Unix, or Red Hat Linux, or vSphere® from VMware®, for instance. In some examples, the operating system 160 is provided in the form of a hypervisor that supports multiple virtual machines.

In operation, the host 110 reads data from and writes data to the storage array 130 via the transmission medium 120. The host 110 itself can initiate read and write operations, and/or the host 110 can receive read and write requests from an external computing device. For example, the host 110 can be configured as a data server, and numerous external computing devices can connect to the host 110 to access data in the storage array 130.

As the host 110 operates, events can be raised. These events are stored in the event queue 172. The data storage management program 146 and complex event processor 148, as well as other application programs 144, can access the event queue 172 via the API 152, to perform high level event processing, such as auditing, notification, fault diagnosis, and fault prediction. Generally, events are logged to the system log 150 contemporaneously with the events being stored in the event queue 172. In some implementations, the data storage management program 146 and complex event processor 148 can also access the system log 150 to perform event processing.

Figure 2:
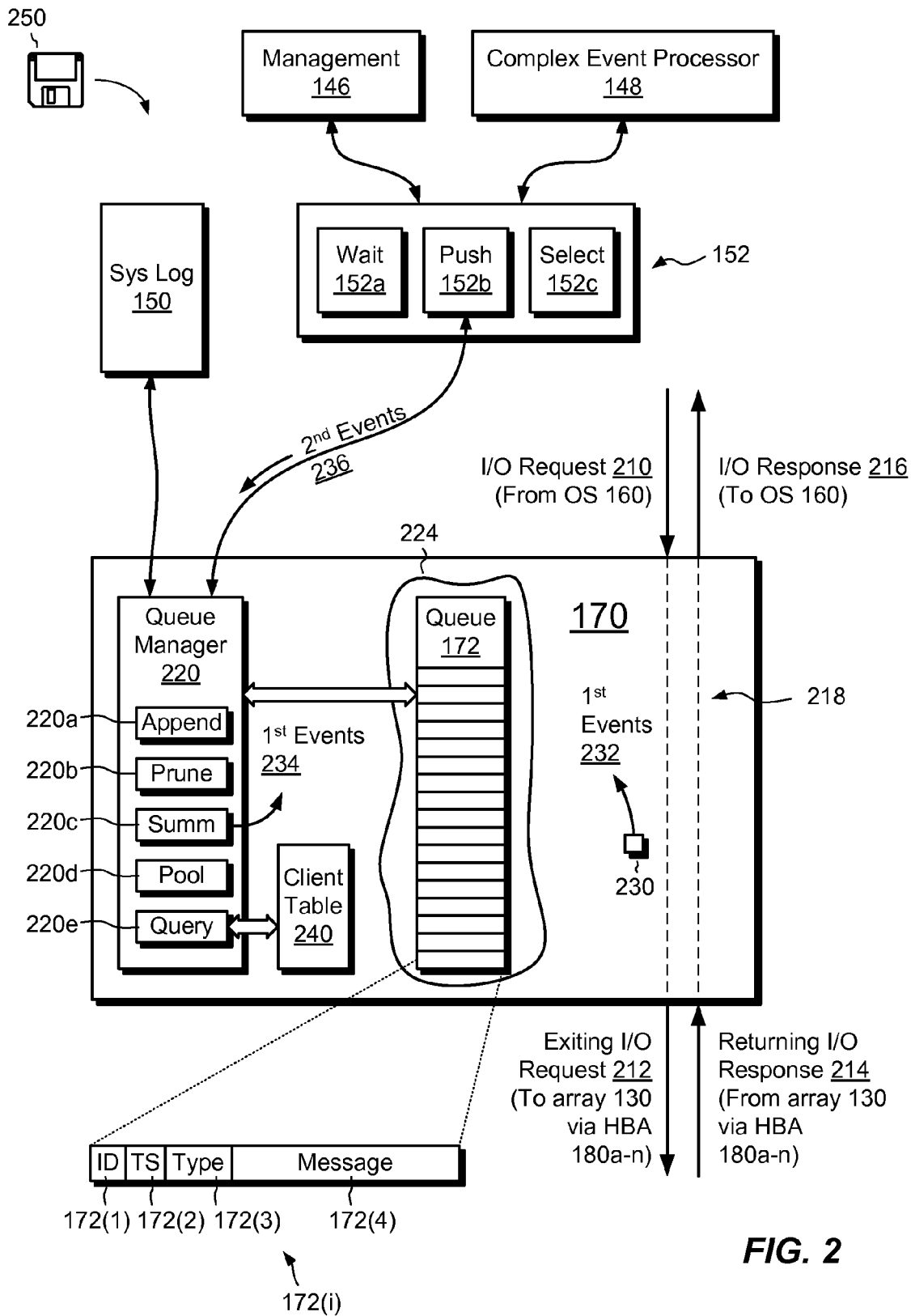
FIG. 2 is a more detailed block diagram of the computing system of FIG. 1.

FIG. 2 shows certain features of FIG. 1 in additional detail. Here, it is seen that the multipathing driver 170, which resides within the operating system kernel 160, includes the event queue 172 and a queue manager 220. The API 152, which resides outside the kernel 160, includes a Wait Interface 152, a Push Interface 152b, and a Select Interface 152c.

The event queue 172 includes numerous records. These records are preferably associated in the form of a linked list, such as a FIFO (i.e., a linked list administered with a first-in, first-out policy). Event records are pushed onto the FIFO in the order the queue manager 220 receives them. Each event record 172(i) in the event queue 172 preferably includes multiple fields, such as an event ID 172(1), a timestamp 172(2), an event type 172(3), and a message 172(4).

The event ID field 172(1) stores a number, such as a 64-bit integer, which uniquely identifies each event. The event ID is incremented for each new event record pushed onto the event queue 172. The queue manager 220 manages wrapping of event IDs.

The timestamp field 172(2) designates the date and time that each event is received by the queue manager 220. The timestamp may be acquired locally, e.g., within the driver 170, or it may be obtained from elsewhere within the operating system kernel 160.

The event type field 172(3) designates the type of event received. Events are classified according to various predetermined types, where different event types pertain to different kinds of occurrences. Some event types relate to lifecycle occurrences (e.g., Create Path, Create Bus, Remove Bus, Add Volume). Others relate to the condition of various components (e.g., Path Up, Path Down, Volume Down). Still others relate to notices created by software constructs and expressed as events so that they can be available for consumption on the queue 172. The set of possible event types may change as computing systems acquire new hardware or software, as hardware and software become obsolete, and/or as capabilities change.

The message field 172(4) contains additional information about an event. The information can include hardware details, such as path, bus, or volume information. It may also include messages generated by the queue manager 220, or messages generated by the application programs 144. Messages from application programs 144 include a wide range of content, including "notes for the queue," as well as designations of I/O policies that the application programs 144 can set for the multipathing driver 170 (e.g., SymOpt, CLARopt, or round-robin, for example).

The queue manager 220 performs a wide range of functions, such as receiving events, recording events, and managing the event queue 172. The queue manager 220 includes a number of kernel-level software constructs. These include an Append Construct 220a, a Prune Construct 220b, a Summary Construct 220c, a Pool Construct 220d, and a Query Construct 220e.

The Append Construct 220a appends new event records to the event queue 172 in the order the queue manager 220 receives them. The Append Construct 220a assigns event IDs 172(1) and timestamps 172(2) to events. Event IDs are produced using a software counter, which is incremented for each new event record pushed onto the event queue 172. Timestamps are acquired internally to the multipathing driver 170 or via a system call.

The Prune Construct 220b implements a policy for removing event records from the event queue 172 when the event records are no longer needed or when the event queue 172 becomes full. The policy may simply be to allow the oldest event records in the event queue 172 to expire and fall off the event queue 172. A more sophisticated policy may preserve records of more important events while allowing records of less important events to expire. For example, events pertaining to buses 120a-n are generally deemed more important that events pertaining to paths 122, since each bus contains multiple paths 122. In some examples, the Prune Construct 220b may thus preserve bus events while allowing path events arising out of the same faults to expire.

The Summary Construct 220c performs local, kernel-based, event processing, which may include, for example, correlation of events, aggregation of related events, and filtering of redundant events. The Summary Construct 220c can itself produce events 234, which provide summary information about the condition of the host 110, transmission medium 120, and/or storage array 130. These events 234 are conveyed to the Append construct 220a, where they are given event IDs and timestamps, and where they are ordered in the event queue 172 along with other events (e.g., events 232 and 236). Each event record produced by the Summary Construct 220c generally has a message 172(4) that summarizes results of any event processing in textual form.

The Pool Construct 220d performs memory allocation functions. In particular, the Pool Construct 220d allocates a pool 224 of kernel memory for use by the event queue 172. The pool 224 may be expanded or contracted, based on the number of event records the event queue 172 is desired to maintain. The Pool Construct 220d can compute the size of the pool 224 based on various factors, such as the amount of available kernel memory, the number of events that are expected to arise out of an expected set of circumstances, or the number of paths 122 used to connect the computing system 110 to the storage array 130.

The Query Construct 220e performs queries of the event queue 172. Queries can be received from the API 152 (e.g., from the Select Interface 152(c)) or may be produced internally within the multipathing driver 170. The Query Construct 220e tests the contents of the event queue 172 against various criteria to produce sets of matching records for use by application programs 144 or other software constructs.

In some examples, the query construct 220e operates in connection with a client table 240. The client table 240 is preferably an array or other data structure within the multipathing driver 170, which stores client-specific information in connection with client identifiers ("client IDs"). Each client ID identifies a software construct and/or user that accesses the multipathing driver 170. The client table 240 stores, for example, the event ID 172(1) of the last event record of the event queue 172 consumed by the client identified by the client ID. The client table 240 also stores, for example, an event mask that can be applied to any queries made by the client designated by the client ID. The event mask operates to further narrow any queries received from the client based on the client's previous interactions with the multipathing driver 170, so that records returned from queries have greater relevance to the client. In one example, the client table 240 is populated with information over time, as the multipathing driver 170 interacts with different clients. Client IDs and information extracted from client interactions with the multipathing driver 170 are stored in the client table 240 for later use, when the clients again interact with the multipathing driver 170 to query the event queue 172. The client table 240 is preferably maintained using minimal memory resources. For example, the client ID and associated event ID 172(1) and mask for a client are typically purged or pruned after a prolonged period of inactivity of the client.

Events fall broadly into two categories: first events and second events. First events are those which originate within the multipathing driver 170. These include events 232 and events 234. The events 232 arise from event detecting code 230 of the multipathing driver 170, and the events 234 arise from the Summary construct 220c, as described above. Events 232 result from the multipathing driver 170 detecting certain conditions relating to the host 110, the transmission medium 120, the storage array 130, the multipathing driver 170 itself, or other components of the computing environment 100. For example, if a path becomes inoperative, the multipathing driver 170 can detect the inoperative state (via the event detecting code 230) and raise a "Path Down" event. The event is then conveyed to the Append construct 220a for storage on the event queue 172. It is understood the events 232 originate within the driver 170, even though the circumstances on which they are based can occur anywhere in the computing environment 100.

The second events arise from software constructs outside the kernel 160, such as the data storage management program 146 and the complex event processor 148, and are conveyed to the multipathing driver 170 via the Push Interface 152b of the API 152. These events include messages that can be added to, or "pushed" onto, the event queue 172. The messages can take any form, but typically include summary messages and audit messages. Summary messages provide high level diagnostic or prognostic information. Audit messages report actions taken by an application program 144 or other software construct, and explain or put into context other events. For example, an application program 144 can disable a particular path for testing purposes. Disabling the path typically causes a "Path Down" event to be created automatically by the multipathing driver 170. In this situation, an audit message can be pushed onto the event queue 172 to inform other users or programs that the contemporaneous "Path Down" event does not indicate a fault in the system but rather a proper response to a test.

The second events 236 conveying summary and audit messages are received by the queue manager 220, assigned event IDs, timestamped, and pushed onto the event queue 172. Second events 236 are stored in the event queue 172 along with first events 232 and 234, where events are stored in the order the queue manager 220 receives them, irrespective of their origin.

In contrast with the Push Interface 152b, which causes event records to be written to the multipathing driver 170, the Wait Interface 152a and the Select Interface 152c cause event records to be read from the multipathing driver 170.

The Wait Interface 152a sends requests to the multipathing driver 170, calling upon it to return records of the next respective event to occur after the requests are received. A request typically originates from a software construct (e.g., an application program 144). A timeout is specified. If an event occurs within the timeout period, the queue manager 220 records the event and returns a copy of the event record to the Wait Interface 152a of the API 152, which then returns the copy to the software construct that requested the record. Often, application programs 144 or other software constructs access the Wait Interface 152a in a loop, so that they can obtain records of multiple events as they occur.

The Select Interface 152c operates more flexibly. The Select Interface 152c is arranged to receive a query from a software construct. The query specifies one or more criteria, which relate to the fields 172(1)-172(4) of the event records. The query is transferred to the queue manager 220, which invokes the Query Construct 220e to run the query on the records of the event queue 172. Queries may be further limited based on event masks or other information stored in the client table 240. Copies of any records that satisfy the query criteria are then returned to the Select Interface 152c, which returns the records to the software construct that requested the records.

As with prior implementations, a system log 150 may be provided for long-term storage of event records. Unlike the event queue 172, which is typically volatile and has a limited size, the system log 150 is non-volatile and can grow indefinitely. Therefore, the system log 150 can include a very long history of events pertaining to the computing environment 100.

The different interfaces 152a, 152b, and 152c of the API 152 generally communicate with the multipathing driver 170 using IOCTL (I/O Control) commands, or variants thereof. The software constructs, such as the application programs 144, the API 152, and the multipathing driver 170, may be written using any of a number of suitable programming languages and/or programming or scripting tools, and also may be compiled as executable machine language code or intermediate code that is executed on a framework or virtual machine.

The software constructs of the multipathing driver 170 (e.g., the queue manager 220 and event detection code 230) are preferably implemented in two sections: a platform-independent section and a platform-dependent section. The platform-independent section employs a collection of software primitives, i.e., code that is not specific to any operating system but that can be readily mapped to operating system code of any operating system. The platform-dependent section maps each of the primitives to operating system specific code. The use of primitives simplifies the development and deployment of the multipathing driver 170 across multiple operating system platforms.

The software of the multipathing driver 170 generally includes both a control path and a data path 218. Features relating to event storage, maintenance, and analysis are parts of the control path of the multipathing driver 170. Features relating to actual data storage to the storage array 130 and data retrieval from the storage array 130 are parts of the data path 218. For example, the data path 218 conveys I/O requests 210 from the operating system 160 to the storage array 130 by processing I/O requests 210 and sending the processed requests 212 to the storage array 130. Similarly, the data path 218 receives I/O responses 216 from the storage array 130 by processing I/O responses 214 and providing processed I/O responses 216 to the operating system 160. The I/O responses 214 can include payload (i.e., data read from the storage array 130) and/or acknowledgements that data has been successfully written to or read from the storage array 130.

The arrangement shown in FIG. 2 allows records of events originating from the multipathing driver 170 to be stored along with events originating from various software constructs (e.g., 146, 148). Event records are stored in chronological order and can be readily consumed in chronological order by the software constructs or any other consumer with access to the driver 170. Patterns among the event records can be examined within the driver 170, and messages can be added to the event queue 172 to summarize activities.

FIGS. 3-10 illustrate processes that may be carried out in connection with the computing environment 100. These processes are typically performed by the software constructs, described in connection with FIGS. 1 and 2, which reside in the memory 142 of the computing system 110 and are run by the set of processors 140. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

Figure 3:
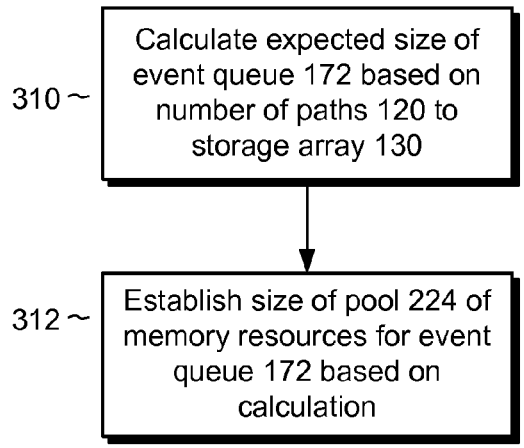
FIG. 3 is a flowchart of an example process for allocating memory to the event queue of FIGS. 1 and 2.

FIG. 3 shows a process of allocating the pool 224 of memory to the event queue 172. This process is typically carried out by the Pool Construct 220d of the queue manager 220. At step 310, the Pool Construct 220d calculates an expected size of the event queue 172. The size of the event queue 172 is based on the number of paths 122 that connect the host 110 to the storage array 130. The size of the event queue 172 may be based on other factors as well, such as the amount of available kernel memory and/or the number of events that are expected to arise out of a certain set of circumstances. At step 312, the Pool Construct 220d dynamically resizes the buffer pool through allocation or deallocation of kernel memory to or from the pool 224 based on the results of the calculation of step 310.

Figure 4:
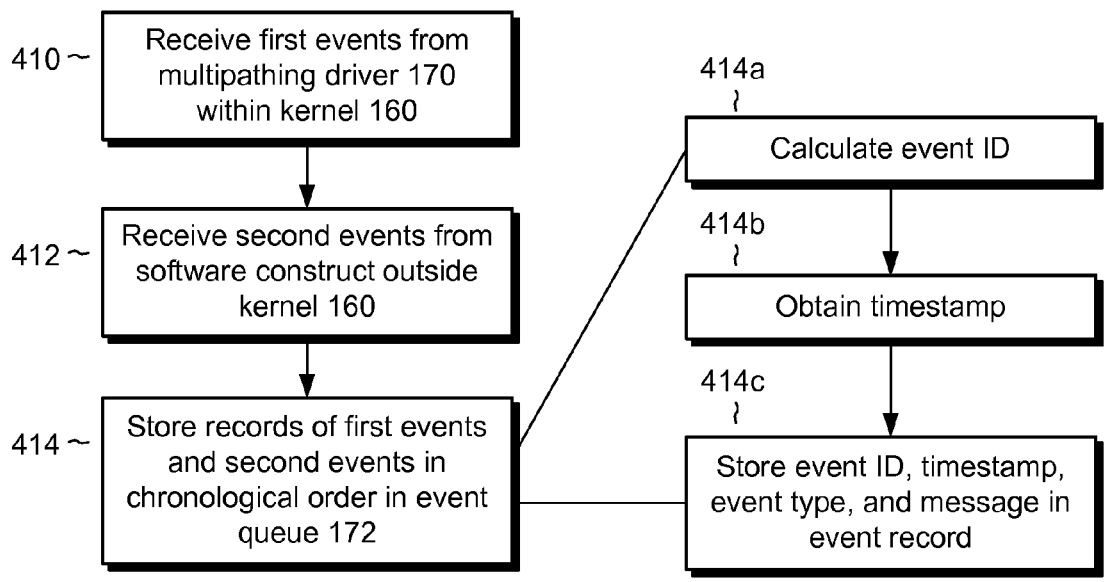
FIG. 4 is a flowchart of an example process for storing events originating from different parts of the computing system in the event queue of FIGS. 1 and 2.

FIG. 4 shows a process for receiving and recording events. The process of FIG. 4 is typically carried out by the queue manager 220 of the multipathing driver 170. At step 410, the queue manager 220 receives first events (e.g., 232, 234) that originate from within the multipathing driver 170. The first events include events 232 detected by the event detecting code 230. The first events also include events 234 generated by the Summary Construct 220c.

At step 412, the queue manager 220 receives second events 236. The second events originate from software constructs (e.g., 146, 148) from outside the kernel 160 and include messages to be pushed onto the queue 172.

At step 414, the queue manager 220 stores records of the first events and the second events received at steps 410 and 412. The records are stored chronologically, in the order the queue manager 220 receives them.

Step 414 includes multiple sub-steps 414a-414d. These sub-steps are typically conducted by the Append Construct 220a. At sub-step 414a, the event ID is calculated (i.e., by the software counter within the Append Construct 220a). The Append Construct 220a also obtains a timestamp (sub-step 414b). The Append Construct 220a then stores the event ID and timestamp, as well as the event type and any included message in the event record, and appends the event record to the event queue 172 (sub-step 414c).

Figure 5:
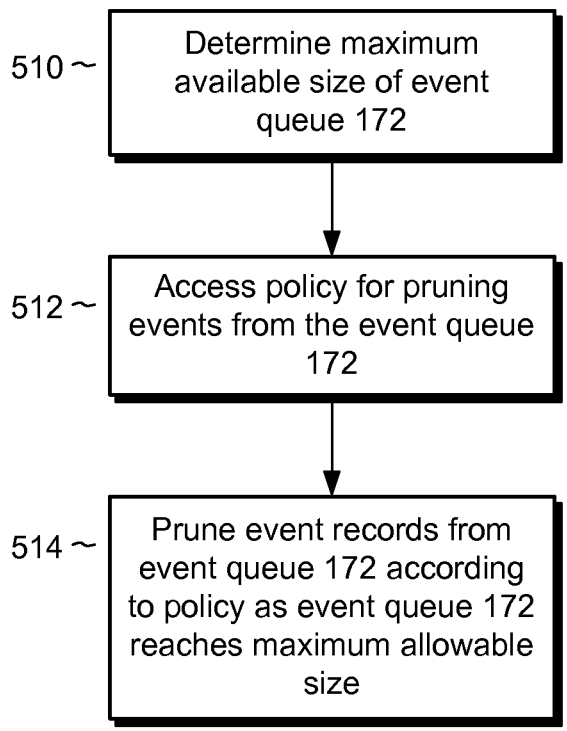
FIG. 5 is a flowchart of an example process for removing records from the event queue of FIGS. 1 and 2.

FIG. 5 shows a process for removing events from the event queue 172. This process is generally carried out by the Prune Construct 220b of the queue manager 220.

At step 510, the Prune Construct 220b determines the maximum available size of the event queue 172 (e.g., by requesting the information from the Pool Construct 220d).

At step 512, the Prune Construct 220b accesses a policy for pruning events from the event queue 172. The policy is generally stored within the Prune Construct 220b and includes a set of rules for assigning different priorities to different event records based on factors such as age of the record and diagnostic or prognostic significance of the record.

At step 514, event records are pruned from the event queue 172 according to the policy as the event queue 172 reaches the maximum allowable size as determined at step 510. In some examples, the Prune Construct 220b does not wait for the event queue 172 to become full, but rather prunes event records as part of maintenance activity to keep the size of the event queue 172 manageable and to ensure that event records that are maintained are relevant to ongoing activities.

Figure 6:
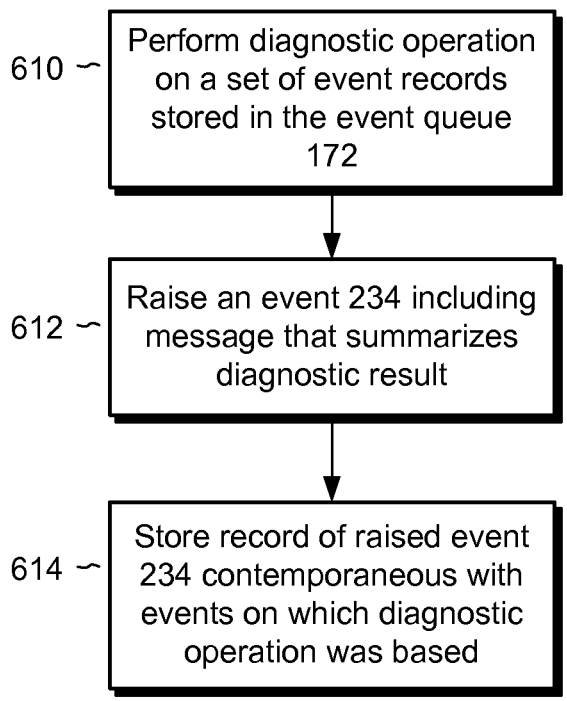
FIG. 6 is a flowchart of an example process for performing a diagnostic operation on a set of event records in the event queue and storing an event record in the event queue that summarizes the result of the diagnostic operation.

FIG. 6 shows a process conducted by the queue manager 220 for generating and storing event records originated by the Summary Construct 220c of the queue manager 220. At step 610, the Summary Construct 220c identifies a set of event records stored in the event queue 172 and performs a diagnostic operation on the set of event records. At step 612, the Summary Construct 220c raises an event 234 including a message summarizing the diagnostic result. At step 614, a record of the event 234 including the diagnostic message is stored on the event queue 172, in chronological order with other events occurring contemporaneously. If the set of records examined by the Summary Construct 220c includes the most recent records that have been stored, then the event record summarizing the diagnostic result is stored on the event queue 172 adjacent to the set of events on which the diagnostic message is based. Any application programs 144 or other software constructs referring to the event queue 172 can then receive the diagnostic message ordered in sequence with related event records to assist the application programs 144 or other software constructs in administrative or reporting functions.

Figure 7:
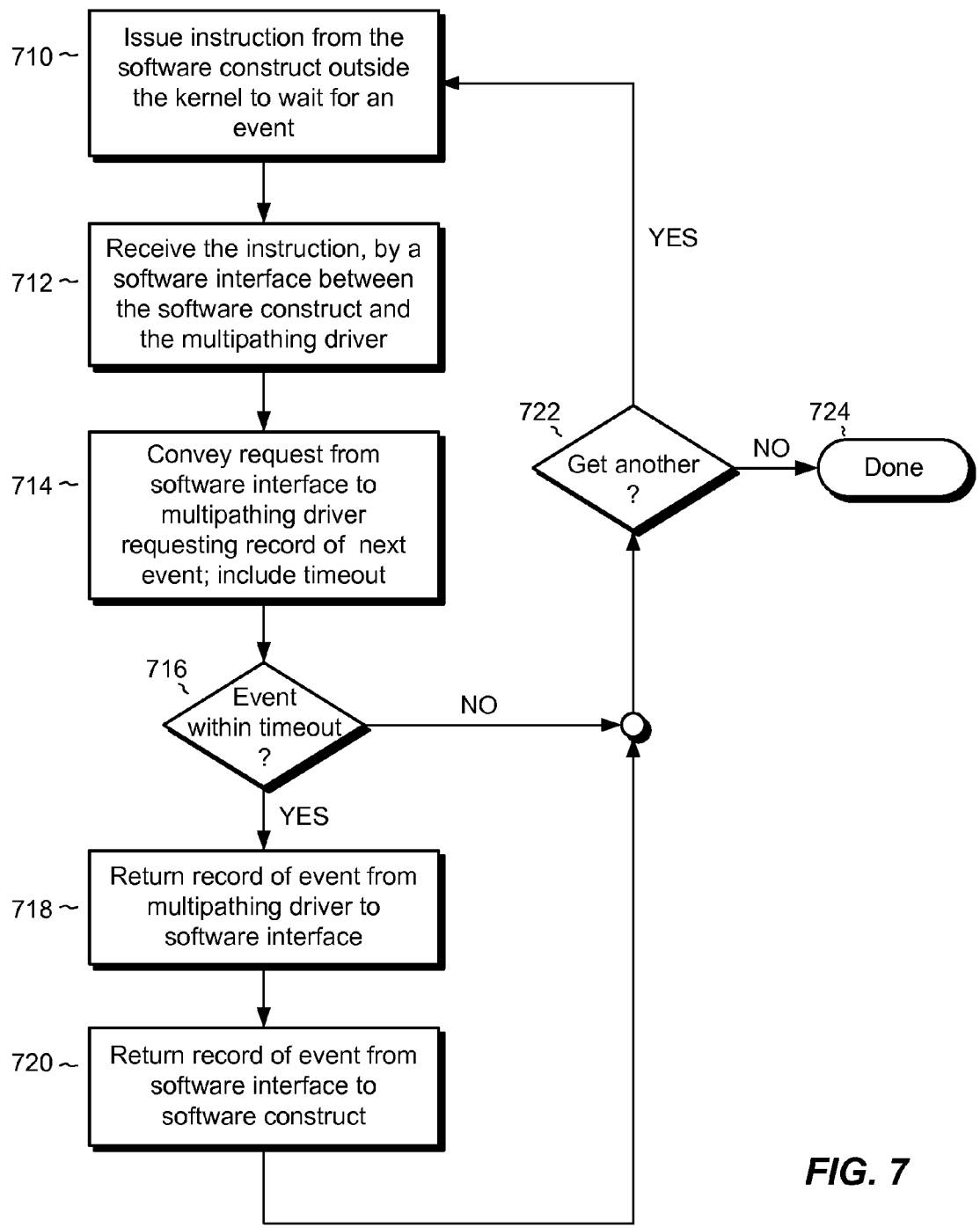
FIG. 7 is a flowchart of an example process of waiting for an event to occur and retrieving a record of the event from the event queue if the event occurs within a designated timeout interval.

FIG. 7 shows a process whereby event records can be obtained from the multipathing driver 170 using the Wait Interface 152a of the API 152. Typically, the process of FIG. 7 is operated in a loop, with a software construct, such as an application program 144, repeatedly requesting and obtaining event records as the associated events occur.

At step 710, a software construct running outside the kernel, such as an application program 144, issues an instruction to wait for an event from the multipathing driver 170 and receive the next event to occur. At step 712, the Wait Interface 152a receives the instruction from the software construct. The instruction is accompanied by a timeout, which defines an interval of time beyond which the software construct will cease to wait for an event.

At step 714, the Wait Interface 152a converts the instruction from the software construct into lower level code (e.g., IOCTL instructions) and conveys the lower level code including the instruction and timeout to the multipathing driver 170. If the multipathing driver 170 does not record an event within the timeout interval (tested at step 716), processing for the instruction is terminated and no event is returned. If another event is requested (step 722), control returns to step 710, where another instruction to obtain another event record may be issued. If the multipathing driver 170 does record an event during the timeout interval, a record of the event is returned from the multipathing driver 170 to the Wait Interface 152a (step 718), and then returned to the software construct that issued the instruction (step 720). The multipathing driver 170 records the event on the event queue 172 in the usual fashion. If another event record is desired (step 722), control returns to step 710, where another instruction to obtain an event is issued. Otherwise, the process may complete at step 724

The multipathing driver 170 preferably supports access from multiple application programs 144, multiple instances of each application program 144, and multiple users. Many application program instances can therefore be waiting for an event from the multipathing driver 170 at the same time. In this circumstance, the multipathing driver 170 responds to each application instance, returning the same event record to each application instance that issued an instruction to return the next event record, if the event occurs within the respective session's timeout.

Figures 8, 9:
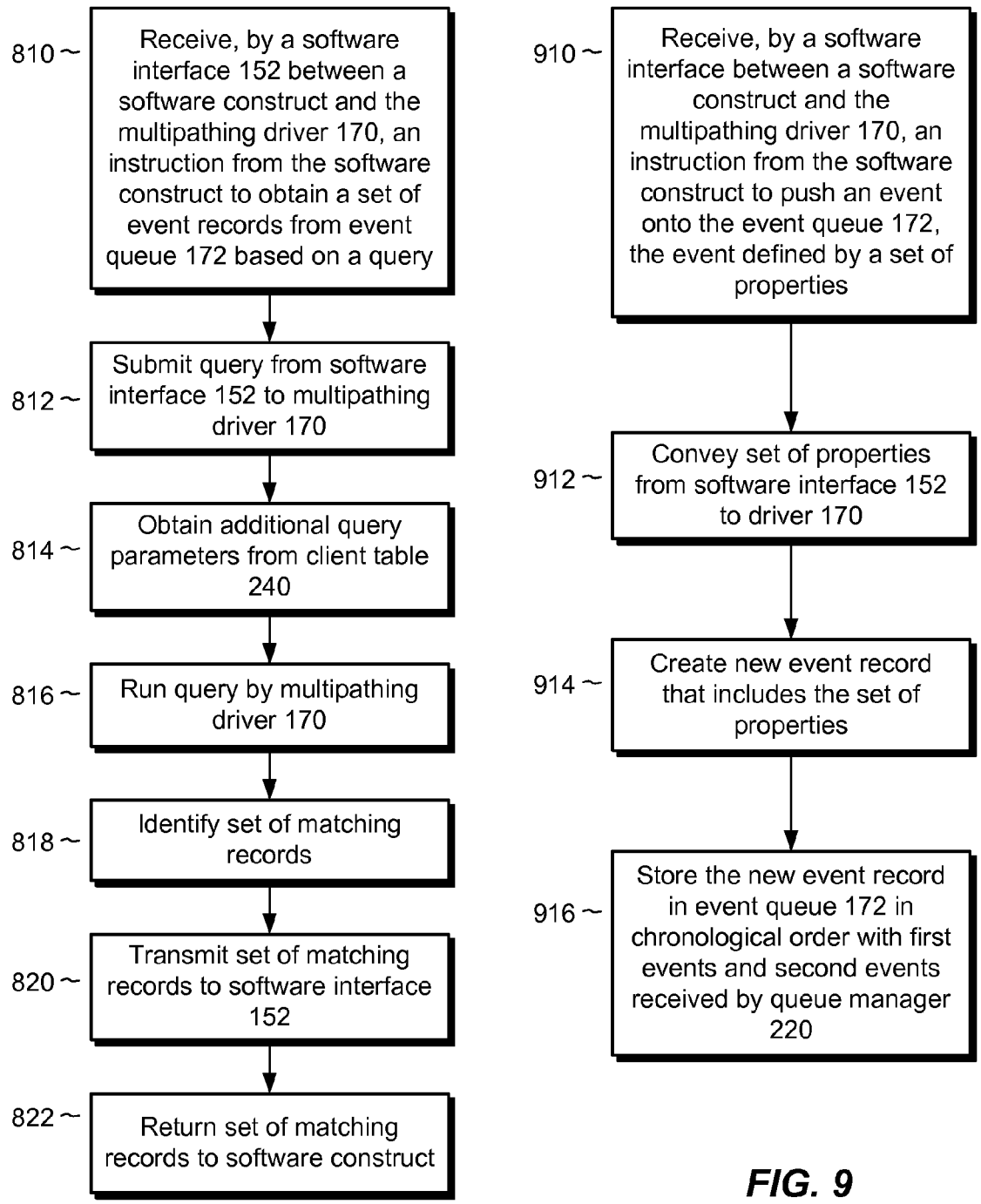
FIG. 8 is a flowchart of an example process for querying the event queue to obtain a set of desired event records.
FIG. 9 is a flowchart of an example process for pushing an event onto the event queue of FIGS. 1 and 2.

FIG. 8 shows a process whereby event records can be obtained from the multipathing driver 170 using the Select Interface 152c of the API 152. At step 810, the Select Interface 152c receives an instruction from a software construct (e.g., an application program 144). The instruction includes a query specifying a set of criteria, to obtain a set of event records from the event queue 172 that match the set of criteria. The set of criteria pertain to one or more fields 172(1)-172(4) of the event records stored in the event queue 172. For instance, the criteria can specify all records having an event ID greater than a particular value, where that value is the event ID of the last event record that the requesting software construct previously obtained. Rather than having to wait for each individual event as it occurs, as is done using the Wait Interface 152a, the Select Interface 152c allows a software construct to request records on a regular basis, or at will, and to receive records of all events to have occurred since its last request. Query criteria can be based on event IDs, event types, messages, or any combination of fields, where individual criteria are combined in a manner similar to that used for conventional database queries, such as SQL queries.

At step 812, the Select Interface 152c translates the instruction into IOCTL commands and submits the instruction to the multipathing driver 170. The multipathing driver 170 invokes the Query Construct 220e. At step 814, the Query Construct 220e may access the client table 240 to obtain additional query criteria from the client table 240, which are particular to the client that issued the query. The additional query criteria may include, for example, filters for certain event IDs 172(1), certain intervals of time as designated by timestamps 172(2), or certain event types 172(3). These filters may be applied for clients, even without the clients explicitly specifying the filters, to improve the relevance of event records returned in response to the clients' queries. In a particular example, the client table 240 stores the event ID of the last record consumed by a client. When a query is later received by that client, results are filtered to include only those event records having event IDs greater than the event ID of the last record consumed. In this manner, the client is not required to store the last record consumed and only receives event records relevant to ongoing processes.

The query, as modified by the client table 240, is run at step 815, a set of matching records is identified at step 818, and the set of matching records is returned to the Select Interface 152c at step 820. The matching records are then returned to the software construct that issued the instruction at step 822.

FIG. 9 shows a process whereby software constructs, such as the data storage management program 146 and the complex event processor 148, can push event records onto the event queue 172. At step 910, the Push Interface 152b of the API 152 receives an instruction from a software construct to push an event onto the event queue 172. The event is defined by a set of properties, which may include an event type and a message. At step 912, the Push Interface 152b conveys the set of properties to the multipathing driver 170. The Append Construct 220a of the queue manager 220 creates a new event record including the received properties (step 914) and stores the new event record in the event queue 172 (step 916). The event record is stored in chronological order along with other events received by the queue manager 220.

The improvements described herein reduce reliance upon the system log 150 for processing multipathing events. For legacy purposes, a system log 150 may continue to be provided; however, it no longer serves any unique purpose for multipathing other than to permanently store event records which cannot be permanently retained by the event queue 172. With the role of the system log 150 diminished, the criticality of maintaining log daemons for different operating systems is similarly diminished. Some platforms, such as embedded operating systems for virtual machines, eliminate these daemons altogether.

In addition, with timestamps applied to events at the level of the multipathing driver 170, the variable latency involved in applying timestamps at the system log 150 is avoided. Timestamps applied at the driver level are nearly instantaneous. Therefore, timestamping errors are substantially reduced.

Further, the ability of the queue manager 220 to gather events from different sources (e.g., 232, 234, and 236) and to store the events in the chronological order received creates a clear record in the event queue 172 of sequences of events, which can be consumed from the event queue 172 by application programs 144 or other software constructs. Accurate information about events can be used to compute accurate diagnoses of problems in the computing environment 100. They can also be used to notify system administrators of potential faults before they become critical, thus preventing failures and reducing system down time.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 250 in FIG. 2). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, it is shown and described that software constructs that access the multipathing driver 170, such as application programs 144, are installed within the host 110. This is merely an example, however. The software constructs that access the multipathing driver 170 can be both on the host 110 and off the host 110 (e.g., on one or more other computing devices connected to the host 110 via a network).

Also, although the software constructs described herein have been disclosed for the purpose of managing events in multipathing drivers, the same constructs can be used for managing events relating to other aspects of a computing system.

Those skilled in the art will therefore understand that various changes in form and detail may be made to the embodiments disclosed herein without departing from the scope of the invention.

What is claimed is:

1. A method of managing events pertaining to input/output (I/O) activities in a computing system coupled to a storage array through multiple paths, the method comprising:
   receiving multiple first events by a queue manager that manages an event queue, the queue manager and the event queue being part of a multipathing driver running within a kernel of the computing system, the first events originating from within the multipathing driver;
   receiving multiple second events by the queue manager, the second events originating from a software construct running outside the kernel of the computing system; and
   storing records of the first events and the second events in the event queue, including chronologically ordering the records of the first events and the second events in the event queue in order of receipt by the queue manager.

2. The method as in claim 1, wherein storing the records of events includes:
   calculating an event ID for each event, the event ID being a number that is incremented for each event received by the queue manager and reflects the chronological order in which the event is received by the queue manager; and
   storing the event ID for each event in the record for the event in the event queue.

3. The method as in claim 2, wherein storing events in the event queue further includes:
   obtaining, for each event, a timestamp indicating a date and time at which the respective event is received by the queue manager; and
   storing the timestamp for each event in the record for the event in the event queue.

4. The method as in claim 3,
   wherein receiving multiple second events by the queue manager includes receiving, for each second event, a message from the software construct, and
   wherein storing events in the event queue further includes storing the message received for each second event in the record for the respective second event in the event queue.

5. The method as in claim 1, further comprising:
   calculating an expected optimal memory size of the event queue based at least in part on a number of paths connecting the computing system to the storage array; and
   establishing, based on the calculating, a size of a pool of memory resources for maintaining the event queue in the multipathing driver within the kernel.

6. The method as in claim 1, further comprising:
   accessing a policy stored in the multipathing driver for pruning events from the event queue; and
   pruning events from the event queue according to the policy.

7. The method as in claim 1, further comprising the queue manager within the kernel:
   performing a diagnostic operation based on a set of event records stored in the event queue to produce a diagnostic result;
   raising an event, the raised event including a message that summarizes the diagnostic result; and
   storing a record of the raised event in the event queue, the record including the message that summarizes the diagnostic result pertaining to the set of event records.

8. The method as in claim 1, further comprising:
   receiving, by a software interface between the software construct and the multipathing driver, an instruction from the software construct to wait for an event;
   in response to the instruction, submitting a request from the software interface to the multipathing driver asking to receive a record of the next event to occur, the request including a timeout interval specifying an amount of time after which the multipathing driver will cease to wait for the next event;
   after the next event occurs and is stored on the event queue within the timeout interval, returning the record of the event from the multipathing driver to the software interface; and
   returning the record of the event from the software interface to the software construct.

9. The method as in claim 8, further comprising:
   the software interface receiving an instruction from the software construct to obtain a set of records from the event queue, the set of records being defined by a query including a set of criteria;
   submitting the query from the software interface to the multipathing driver;
   performing the query by the multipathing driver including applying the set of criteria to the records stored in the event queue;
   identifying a set of matching records from the event queue that satisfy the set of criteria;
   returning the set of matching records from the multipathing driver to the software interface; and
   returning the set of matching records from the software interface to the software construct.

10. The method as in claim 9, further comprising, prior to performing the query, applying additional query criteria particular to a client associated with the software construct, the additional query criteria stored in the multipathing driver in kernel memory.

11. The method as in claim 9, further comprising:
   the software interface receiving an instruction from the software construct to push an event onto the event queue of the multipathing driver, the event being defined by a set of event properties;
   conveying the set of event properties from the software interface to the multipathing driver;
   creating a new event record that includes the set of event properties; and
   storing the new event record in the event queue in chronological order with the first events and the second events received by the queue manager.

12. The method as in claim 1, further comprising:
   receiving, by a software interface between the software construct and the multipathing driver, an instruction from the software construct to obtain a set of records from the event queue, the set of records being defined by a query including a set of criteria;
   submitting the query to the multipathing driver;
   performing the query by the multipathing driver including applying the set of criteria to the records stored in the event queue;
   identifying a set of matching records from the event queue that satisfy the set of criteria;
   returning the set of matching records from the multipathing driver to the software interface; and
   returning the set of matching records from the software interface to the software construct.

13. The method as in claim 1, further comprising:
   receiving, by a software interface between the software construct and the multipathing driver, an instruction from the software construct to push an event onto the event queue of the multipathing driver, the event being defined by a set of event properties;
   conveying the set of event properties from the software interface to the multipathing driver;

creating a new event record that includes the set of event properties; and storing the new event record in the event queue in chronological order with the first events and the second events received by the queue manager.

14. The method as in claim 13, further comprising:

initiating, from the software construct, a data storage activity that causes a set of events to be generated by the multipathing driver and stored in the event queue; and from the software construct, pushing an event onto the event queue, the event including a description of the data storage activity that caused the set of events to be generated.

15. The method as in claim 1, wherein the software construct running on the computing system is associated with a client ID, and the method further comprises:

storing the client ID associated with the software construct and a filter criterion specific to the client ID in the multipathing driver within the kernel of the operating system;

subsequently receiving a request for event information from the software construct;

obtaining the client ID of the software construct;

obtaining the requested event information, including applying the filter criterion specific to the client ID to event records; and providing a filtered list of event records to the software construct.

16. The method as in claim 1, wherein the event queue is stored in volatile memory, and wherein the method further comprises logging event records in a system log stored in non-volatile memory outside the multipathing driver.

17. The method as in claim 1, further comprising storing an event type for each event in the record for the event in the event queue, the event type being one of a predetermined set of event types that each describe a general category of events.

18. A host computing system, comprising:

a set of processors;

memory, coupled to the set of processors to form a specialized circuit, the memory including an operating system kernel, the operating system kernel including an input/output (I/O) driver, wherein the specialized circuit is constructed and arranged to receive multiple first events by a queue manager that manages an event queue, the queue manager and the event queue being part of a multipathing driver running within a kernel of the computing system, the first events originating from within the multipathing driver;

receive multiple second events by the queue manager, the second events originating from a software construct running outside the kernel of the host computing system; and store records of the first events and the second events in the event queue, including chronologically ordering the records of the first events and the second events in the event queue in order of receipt by the queue manager.

19. The host computing system as in claim 18, wherein the specialized circuit is further constructed and arranged to receive, by a software interface between the software construct and the multipathing driver, an instruction from the software construct to push an event onto the event queue of the multipathing driver, the event being defined by a set of event properties;

convey the set of event properties from the software interface to the multipathing driver;

create a new event record that includes the set of event properties; and store the new event record in the event queue in chronological order with the first events and the second events received by the queue manager.

20. A non-transitory computer readable media including instructions which, when executed by a processor, cause the processor to perform a method of managing events pertaining to input/output (I/O) activities in a computing system coupled to a storage array through multiple paths, the method comprising:

receiving multiple first events by a queue manager that manages an event queue, the queue manager and the event queue being part of a multipathing driver running within a kernel of the computing system, the first events originating from within the multipathing driver;

receiving multiple second events by the queue manager, the second events originating from a software construct running outside the kernel of the computing system; and storing records of the first events and the second events in the event queue, including chronologically ordering the records of the first events and the second events in the event queue in order of receipt by the queue manager.

\* \* \* \* \*